United States Patent [19]

Campanell

[11] Patent Number: 4,709,765

[45] Date of Patent: Dec. 1, 1987

[54] TACK DRIVER

[76] Inventor: Ronald J. Campanell, 86A Touisett Rd., Warren, R.I. 02885

[21] Appl. No.: 846,289

[22] Filed: Mar. 28, 1986

[51] Int. Cl.[4] .............................................. B23B 45/16

[52] U.S. Cl. ...................................... 173/119; 173/90; 227/146

[58] Field of Search .................. 173/119, 90, 170, 91, 173/13; 227/146, 132, 114, 147; 29/254; 27/21

[56] References Cited

U.S. PATENT DOCUMENTS 2,907,241 10/1959 Lazar .................................. 29/254

3,135,147 6/1964 Curtis et al. ....................... 173/119

FOREIGN PATENT DOCUMENTS 2163083 2/1986 United Kingdom ..................... 146/

*Primary Examiner*—Paul A. Bell

*Assistant Examiner*—Willmon Fridie, Jr.

*Attorney, Agent, or Firm*—Salter & Michaelson

[57] ABSTRACT

A device for automatically driving tacks and the like includes a plunger, a hammer element, a drive spring and a release pin which are assembled in a housing and cooperate to effect an impacting action when the outer end of the plunger is pressed against the head of a tack or the like. Specifically, when the head of the plunger is pressed against the head of a tack, the plunger is advanced into the housing to load the drive spring; and when the drive spring is fully loaded, the release pin releases the hammer element so that it is propelled into impacting engagement with the plunger to drive the tack or the like.

5 Claims, 6 Drawing Figures

TACK DRIVER

BACKGROUND AND SUMMARY OF THE INVENTION

The instant invention relates to fastening devices and more particularly to a device which is manually depressible for automatically driving tacks and the like.

Several types of impacting devices have been heretofore available for driving tacks and other fastening elements. In this regard, the U.S. Pat. Nos. Reynolds, 1,601,324; Graffious, 1,824,399; Cullen, 2,212,339; Wheeler, 2,346,884; Binns, 2,481,190; Sitz, 2,774,133; Lazar, 2,907,241; Hammell, 2,962,807; Wright, 4,150,774; and Okuda, 4,312,472 disclose a variety of devices of this general type and represent the closest prior art to the subject invention of which the applicant is aware. In this connection, all of the above patents relate to devices wherein spring elements are manually loaded and then released to effect impacting actions with hammer elements to drive tacks or other fastening elements. The device of the instant invention also operates in this same general manner, but it differs substantially from the devices disclosed in the above patents, both in its operation and in its impacting mechanism. In particular, the device of the instant invention is operative in a simple procedure wherein an end of the device is urged forwardly against a tack to load a hammer element and a drive spring until the hammer element and the drive spring reach a fully loaded position whereupon the hammer element is automatically released by a release pin and propelled into impacting engagement with the plunger to drive the tack. Many of the previously known devices have not been automatically actuatable, and they have required separate elements for loading and unloading the drive springs thereof; and hence they have been substantially more complicated, both structurally and operatively, than the device of the instant invention. Furthermore, the operative components of the tack driving device of the subject invention cooperate in a unique and simple manner to provide substantial advantages over all of the heretofore known devices of this general type.

The device of the instant invention generally comprises a housing, a plunger which is slidably mounted in the housing so that it is longitudinally movable therein between an outwardly extended first position and a retracted second position, a hammer element mounted in the housing, and a drive spring mounted in the housing for biasing the hammer element toward the inner end of the plunger. The hammer element is releasably connected to the plunger by a release pin which maintains the hammer element in axially spaced relation to the inner end of the plunger as it is moved inwardly into the housing from its outwardly extended first position so that the hammer element is urged against the drive spring to effect a loading thereof. However, the release pin is operative so that when the plunger reaches its retracted second position, the hammer element is released from interconnection with the plunger, and the hammer element is propelled into impacting engagement with the inner end of the plunger. Accordingly, by positioning the outer end of the plunger in engagement with the head of a tack or the like, and pushing the housing forwardly so that the plunger is urged towards its retracted second position, the spring and the hammer element are urged into loaded or cocked positions; and finally, when the plunger reaches its retracted second position, the hammer element is released so that it impacts the inner end of the plunger. Further, the impact between the hammer element and the plunger is transmitted to the head of a tack or the like through the plunger so that a driving force is applied to the tack or the like.

Accordingly, it is a primary object of the instant invention to provide a simple, relatively small and easily manipulatable automatic device for driving tacks and other fastening elements.

Another object of the instant invention is to provide a tack driving device wherein a spring is automatically loaded and then released to cause a hammer element to be propelled into impacting engagment with a plunger for driving a tack or the like.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
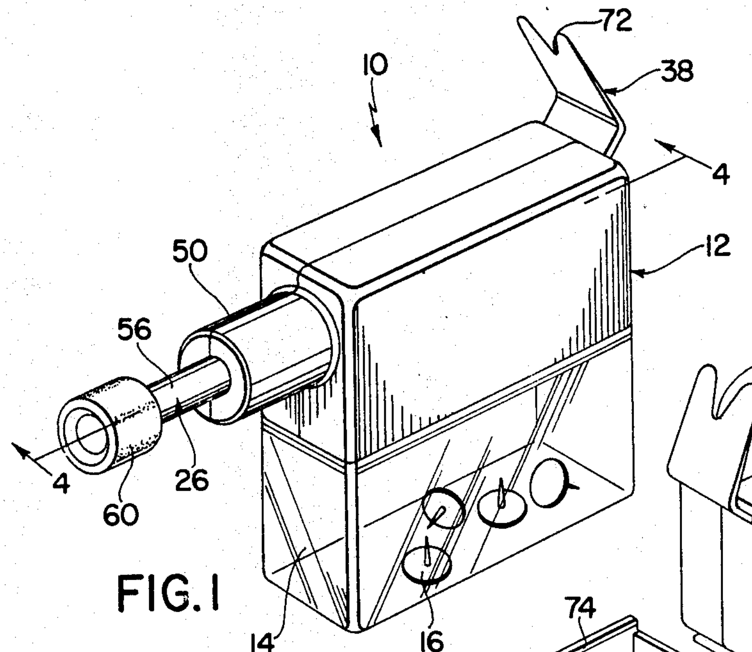
FIG. 1 is a perspective view of the tack driving device of the instant invention.
Figure 2:
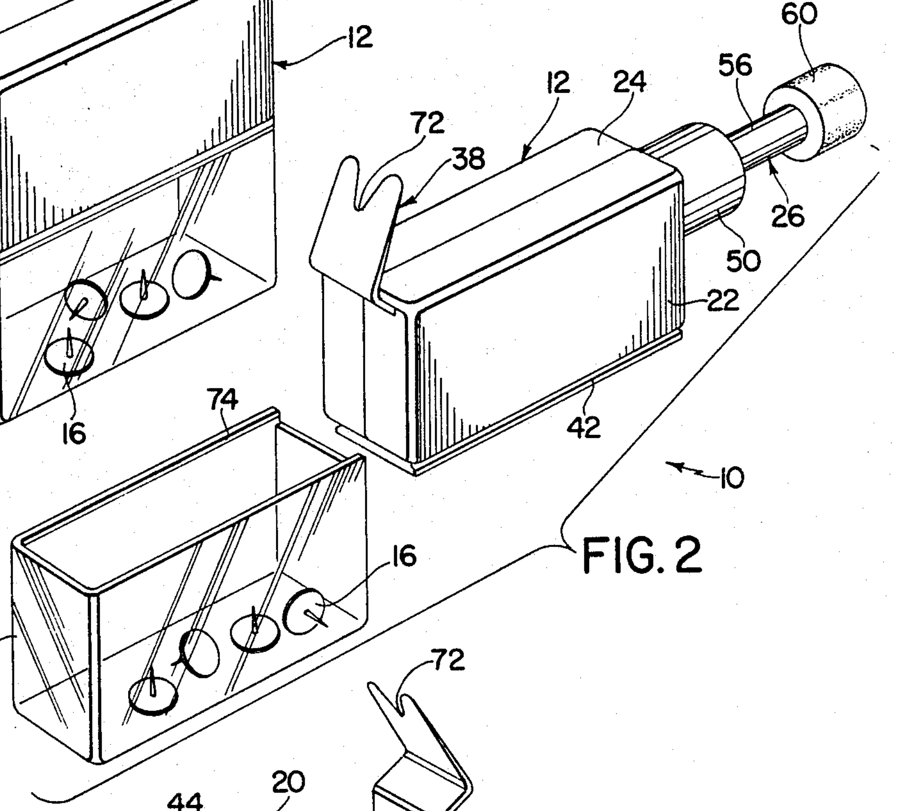
FIG. 2 is a perspective view thereof with the tack magazine detached from the tack driver portion of the device.
Figure 3:
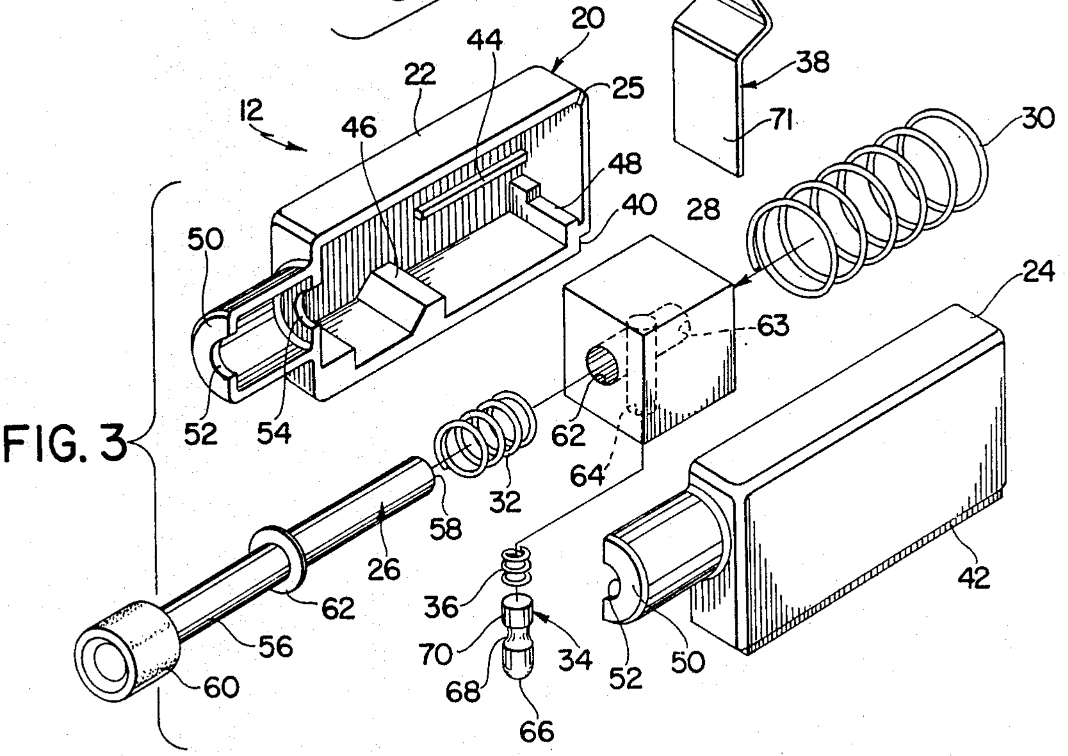
FIG. 3 is an exploded perspective view of the driver portion of the device.

Referring now to the drawings, the device for driving tacks of the instant invention is illustrated and generally indicated at 10 in FIGS. 1, 2 and 4–6, and it comprises a driver portion which is illustrated and generally indicated at 12 in FIGS. 1–6, and a magazine 14 for containing a supply of tacks 16, which is illustrated most clearly in FIGS. 1 and 2. The driver portion 12 is operable for individually driving tacks, such as the tacks 16, into a generally rigid but penetrable member 18; and it comprises a housing generally indicated at 20 comprising first and second housing halves 22 and 24, respectively, a plunger 26, a hammer element 28, a drive spring 30 and a return spring 32. Also included in the driver portion 12 is a release pin 34, a spring 36, and a tack remover element 38. For use of the driver portion 12, the outer end of the plunger 26 is positioned in engagement with the head of a tack 16, and the driver portion 12 is urged forwardly toward the tack 16 so that the plunger 26 is retracted into the housing 20 to load the drive spring 30. When the drive spring 30 has been fully loaded in this manner, the hammer element 28 is automatically released and propelled into impacting engagement with the inner end of the plunger 26 to drive the tack 16.

The housing 20 comprises the first and second housing halves 22 and 24 which are preferably molded of a suitable rigid plastic material in a desired configuration. The housing halves 22 and 24 have exterior channels 40 and 42, respectively, formed therein along the lower side extremities thereof for slidably receiving the magazine 14; and the housing halves 22 and 24 cooperate for defining an inner chamber wherein the operative components of the driver portion 12 are mounted. Elongated longitudinally extending spacer bars 44 are formed on the inner sides of the side walls of the housing halves 22 and 24 for positioning the drive spring 30 in the housing 20, and slots 45 are formed in the upper rear edges of the housing halves 22 and 24. Rearwardly and upwardly inclined cams or ramp sections 46 having substantially flat upwardly facing upper surfaces 47 are formed on the bottom walls of the housing halves 22 and 24, and drive spring positioning members 48 are formed along the lower portions of the rear walls of the housing halves 22 and 24. Formed in the front portions of the housing halves 22 and 24 are tubular neck portions 50 having semicircular notches 52 and 54 at the front and rear ends thereof, respectively. In assembled relation, the housing halves 22 and 24 cooperate to define a substantially rectangular housing, and the neck portions 50 form a forwardly extending tubular neck of cylindrical configuration.

The plunger 26 comprises a cylindrical shaft 56 having an inner end 58, a head 60 which is secured on the outer end of the shaft 56, and a washer-like ring 62 which is secured at an intermediate point in the extent of the shaft 56. The head 60 is dimensioned and configured for receiving the head of a tack 16 and for positioning it in the manner illustrated in FIGS. 4–6 so that it can be effectively driven into a penetrable member, such as the member 18.

The hammer element 28 is preferably made of a weighted metal in a generally square configuration, and it is dimensioned to be received in the housing 20 so that it is slidable on the upper surfaces 47 of the ramp sections 46. The hammer element 28 has a first bore 62 formed therein which is dimensioned to receive the rear portion of the shaft 56, and which extends partially through the hammer element 28 terminating in a rear end 63, and a second bore 64 extends a distance upwardy into the hammer element 28 in substantially perpendicular relation to the first bore 62, the second bore 64 being positioned so that it communicates with the first bore 62 in slightly laterally offset relation. More specifically, the second bore 64 is preferably positioned so that the first bore 62 extends approximately one-third of the way across the diameter of the second bore 64 in the area where the two bores 62 and 64 overlap or communicate.

The drive spring 30 comprises a conventional coil spring, and it is dimensioned to be received in the housing 20 so that it extends between the rear wall of the housing 20 and the hammer element 28 for biasing the hammer element 28 forwardly. In this connection, when the spring 30 is assembled in the housing 20 in this manner, it is retained in position by the positioning element 48, the upper wall of the housing 20, and the spacer bars 44.

The release pin 34 comprises a pin of generally circular cross section having a rounded end 66, and a rounded annular groove 68 is formed in the pin 34 at an intermediate point in the extent thereof. Accordingly, the annular groove 68 defines a release portion comprising an area of reduced cross section in the pin 34, and the pin 34 has an upper retainer portion 70 which has an increased cross section as compared to the area thereof adjacent the annular groove 68. The spring 36 is received in the second bore 64 so that it abuts the inner end thereof, and the pin 34 is received in the bore 64 so that it is outwardly biased by the spring 36. In this regard, the pin 34 is dimensioned so that when it is in a position wherein it projects outwardly from the second bore 64, the upper portion 70 is aligned with the first bore 62, and the notch 68 is disposed in downwardly nonaligned relation with the first bore 62, but so that when the rounded end 66 is flush with the bottom end of the hammer element 28, the notch 68 is substantially aligned with the first bore 62.

The tack remover element 38 is of conventional construction, and it is preferably integrally formed from a suitable sheet metal. In this connection, the tack remover element 38 includes a mounting portion 71, and it has a notch 72 formed therein at the opposite end thereof which defines a pair of spaced fingers which are operable for removing one of the tacks 16 in a conventional manner.

When the driver assembly 12 is in assembled relation, the first and second housing halves 22 and 24, respectively, cooperate for containing and positioning the plunger 26, the hammer element 28, the drive spring 30 and the return spring 32. More specifically, the housing halves 22 and 24 mount the plunger 26 so that it can travel in the apertures defined by the notches 52 and 54 between an outwardly extended first position and a retracted second position, and so that the ring 62 is disposed in the neck portion 50. The return spring 32 is received on the shaft 56 between the ring 62 and the rear wall of the neck portion 50 in which the notches 54 are formed so that the return spring 32 biases the plunger 26 toward the outwardly extended first position thereof. The hammer element 28 is positioned in the housing 20 so that it travels on the upper surfaces 47 of the ramp sections 46, and the inner end 58 of the plunger element 26 is received in the bore 62 in the hammer element 28. The tack removing element 38 is assembled with the housing 20 so that it extends through the slots 45 and so that the mounting portion 71 is positioned adjacent the rear wall portions of the housing halves 22 and 24. The drive spring 30 is assembled in the housing 20 so that it is positioned between the hammer element 28 and the mounting portion 71, and so that as a result the drive spring 30 biases the hammer element 28 forwardly in the housing 20. The release pin 34 and the return spring 36 are received in the bore 64 so that the end 66 of the release pin 34 travels on the adjacent ramp portion 46 as the hammer element 28 is moved forwardly or rearwardly in the housing 20. Accordingly, when the hammer element 28 is moved forwardly or rearwardly in the housing 20, the release pin 34 is moved longitudinally in the second bore 64 to reorient the annular groove 68 relative to the first bore 62.

The magazine 14 is preferably made of a suitable transparent plastic material in an open box-like configuration, and it has elongated inwardly extending ribs 74 along the upper side extremeties thereof. The magazine 14 is assembled with the driver portion 12 so that the ribs 74 are received in the grooves 40 and 42 for slidably mounting the magazine 14 on the driver portion 12.

Figure 4:
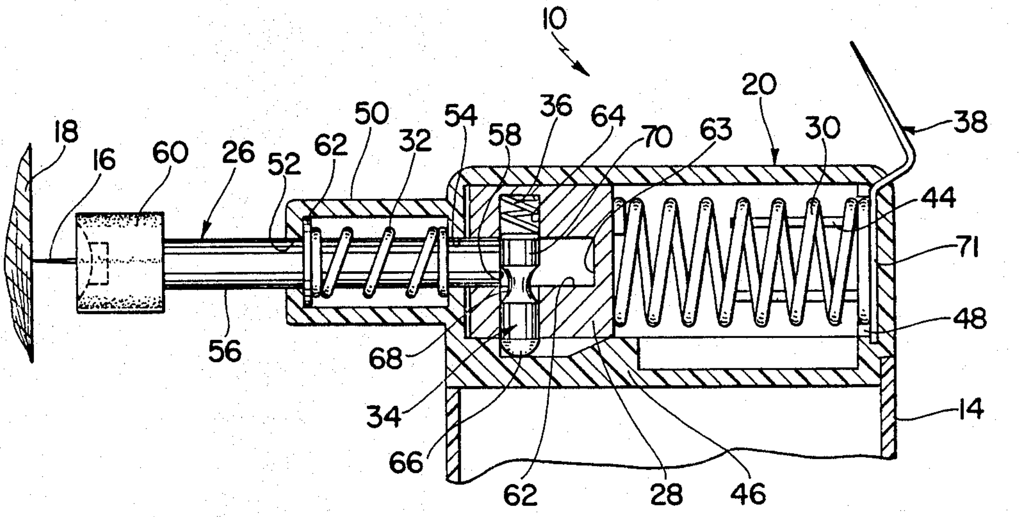
FIG. 4 is a sectional view taken along line 4—4 in FIG. 1.
Figure 5:
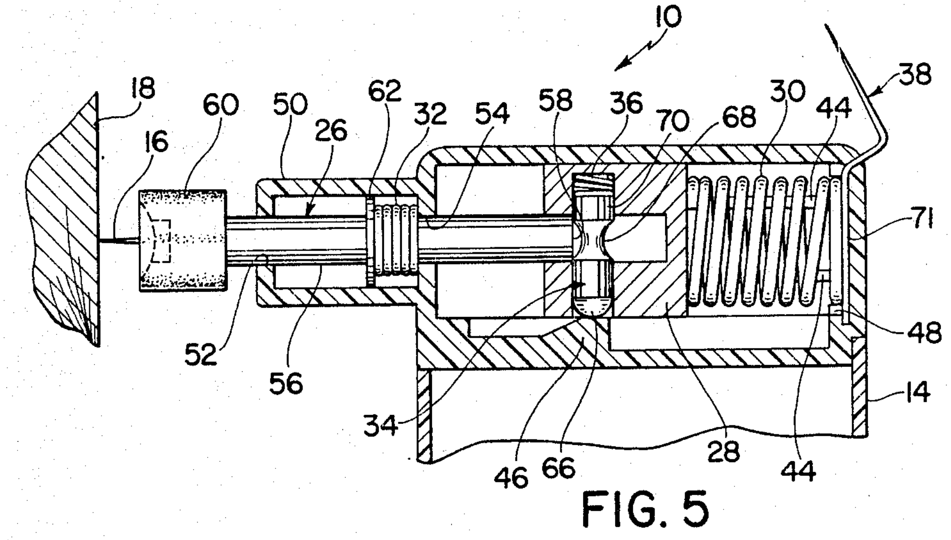
FIGS. 5 and 6 are similar sectional views illustrating the sequential operation of the device.
Figure 6:
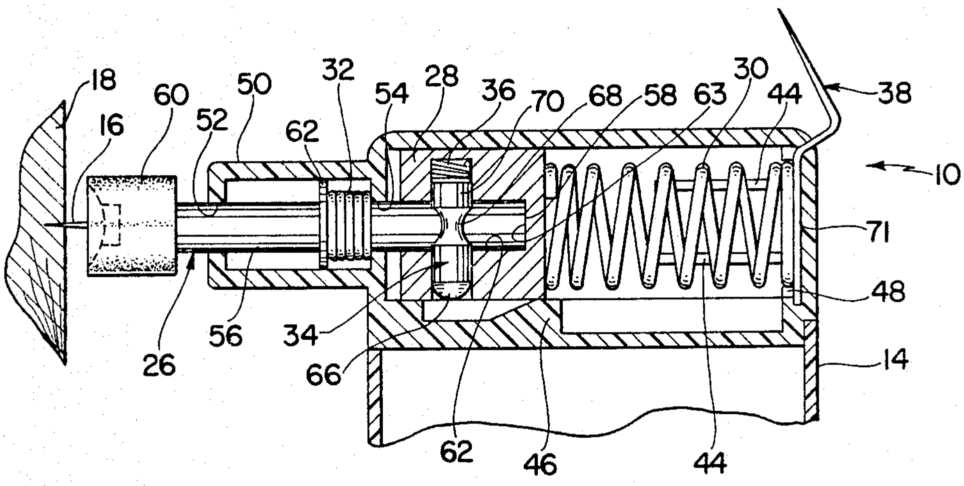

The use and operation of the device 10 is illustrated most clearly in FIGS. 4–6. In this connection, in order to operate the device 10, a tack 16 is removed from the magazine 14 and positioned in the head 60 as illustrated. Thereafter, the device 10 and the tack 16 are positioned so that the point of the tack 16 engages a surface, such as the surface 18. The tack driver 10 is then urged toward the surface 18 so that the plunger 26 is moved from its outwardly extended position to its retracted position as illustrated in FIG. 5. In this connection, as the plunger 26 is moved inwardly into the housing 20, the upper retainer portion 70 of the release pin 34 engages the terminal end 58 of the plunger 26 to maintain the terminal end 58 in spaced relation to the terminal end 63 of the bore 62. As a result, as the rear portion of the plunger 26 is advanced into the housing 20, the hammer element 28 is also moved rearwardly in the housing 20 to load the spring 30. However, as the hammer element 28 is moved rearwardly, the terminal end 66 of the release pin 34 travels on the adjacent cam or ramp section 46 so that it is advanced into the bore 64. Finally, when the release pin 34 is fully advanced into the bore 64 by the adjacent cam or ramp section 46, the annular groove 68 thereon is aligned with the bore 62 so that the shaft 56 can pass beyond the release pin 34 into the rear portion of the bore 62. When this occurs, the hammer element 28 is propelled forwardly toward the forward portion of the housing 20 by the drive spring 30 so that the inner end 63 of the bore 62 impacts the inner end 58 of the plunger 26. This impact is transmitted through the plunger 26 to the tack 16 so that the tack 16 is advanced into the surface 18 as illustrated in FIG. 6. Thereafter, when pressure is released from the tack driver 10, the plunger 26 is returned to its normal outwardly extended position as illustrated in FIG. 4 by the return spring 32; and if the tack 16 is to be driven further into the surface 18, the tack driver 10 can be operated in a similar manner by advancing it toward the surface 18 to again load the spring 30 so that the plunger 26 is again impacted with the hammer element 28.

It is seen therefore that the instant invention provides an effective device for driving tacks and the like. The device 10 is simply and easily operable for driving tacks, such as the tack 16; and because of its highly simple construction, it can be manufactured at a relative low cost. Still further, its relatively simple construction makes it a highly reliable device which can be utilized by virtually anyone to effectively drive tacks and the like. As a result, it is seen that the device 10 represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A device for driving tacks and the like comprising:

(a) a housing, (b) a plunger having inner and outer ends and slidably mounted in said housing so that it projects outwardly therefrom terminating in said outer end, said plunger being slidable in said housing between an outwardly extended first position and a retracted second position;

(c) a hammer element mounted in said housing and having a bore therein which terminates in a bore inner end, the inner end portion of said plunger being slidably receivable in said bore, said hammer element being mounted so that it is movable to a position wherein said bore inner end is in engagement with the inner end of said plunger;

(d) means biasing said hammer element so that said bore inner end is biased toward said plunger inner end;

(e) a release pin mounted in said hammer element, said release pin being of substantialy circular cross section and of elongated configuration, said release pin having an enlarged retainer portion and a reduced release portion, said release portion defining a rounded annular groove in said release pin, said retainer portion engaging said plunger inner end when said plunger is in the first position thereof, said release pin being mounted so that it is slidable between a position wherein said retainer portion engages said plunger inner end to maintain the latter in spaced relation to said bore inner end and a position wherein said reduced release portion is positioned adjacent said bore to enable said plunger inner end to pass by said release pin and to be engaged by said bore inner end when said plunger is in the second position thereof; and (f) means positioning said release pin so that it engages the inner end of said plunger when said plunger is in the first position thereof and also as said plunger is moved from the first position thereof toward the second position thereof but so that said plunger inner end can pass by said release pin when said plunger is in the second position thereof, whereby as said plunger is moved inwardly in said housing, said hammer element is urged against said biasing means to effect a loading thereof, but when said plunger reaches said second position thereof, said hammer element is propelled into impacting enagement with said plunger inner end to drive a tack positioned in engagment with said plunger outer end.

2. In the device of claim 1, said bore further characterized as a first bore, said hammer element further characterized as having a second bore therein which communicates with said first bore and which is substantially perpendicular thereto, said release pin traveling in said second bore.

3. In the device of claim 1, said positioning means comprising a cam, said pin engaging said cam to reposition it in said bore as said plunger is moved to the second position thereof.

4. In the device of claim 3, said positioning means further comprising a spring biasing said release pin into enagement with said cam.

5. A device for driving tacks and the like comprising:

(a) a housing, (b) a plunger having inner and outer ends and slidably mounted in said housing so that it projects outwardly therefrom terminating in said outer end, said plunger being slidable in said housing between an outwardly extended first position and a retracted second position;

(c) a hammer element mounted in said housing and having a bore therein which terminates in a bore inner end, the inner end portion of said plunger being slidably receivable in said bore, said hammer element being mounted so that it is movable to a position wherein said bore inner end is in engagement with the inner end of said plunger;

(d) means biasing said hammer element so that said bore inner end is biased toward said plunger inner end;

(e) a release pin mounted in said hammer element, said release pin being of elongated configuration and being mounted in substantially perpendicular relation to said plunger, said release pin including an enlarged retainer portion and a reduced release portion, said release portion being defined by a rounded substantially transversely extending groove in the outer periphery of said release pin, said release pin being mounted so that it is longitudinally slidable between a position wehrein said retainer portion engages said plunger to maintain said plunger inner end in spaced relation to said bore inner end and a position wherein said reduced release portion is positioned adjacent said bore to enable said bore inner end to engage said plunger inner end; and (f) means positioning said release pin so that it engages the inner end of said plunger when said plunger is in the first position thereof and also as said plunger is moved from the first position thereof toward the second position thereof but so that said plunger inner end can pass by said release pin when said plunger is in the second position thereof, whereby as said plunger is moved inwardly in said housing, said hammer element is urged against said biasing means to effect a loading thereof, but when said plunger reaches said second position thereof, said hammer element is propelled into impacting enagement with said plunger inner end to drive a tack positioned in engagment with said plunger outer end.

* * * * *